Jan. 28, 1941.    P. I. CHANDEYSSON    2,230,131
HOMOPOLAR DYNAMOELECTRIC MACHINE
Filed July 8, 1936        4 Sheets-Sheet 1

Inventor
Pierre I. Chandeysson.
By Bruninga & Sutherland
Attorneys.

Jan. 28, 1941.   P. I. CHANDEYSSON   2,230,131
HOMOPOLAR DYNAMOELECTRIC MACHINE
Filed July 8, 1936     4 Sheets-Sheet 2

Inventor
Pierre I. Chandeysson.
By Bruninga & Sutherland
Attorneys.

Jan. 28, 1941.   P. I. CHANDEYSSON   2,230,131
HOMOPOLAR DYNAMOELECTRIC MACHINE
Filed July 8, 1936    4 Sheets-Sheet 3

Inventor
Pierre I. Chandeysson.
By Brumingg Sutherland
Attorneys.

Jan. 28, 1941.   P. I. CHANDEYSSON   2,230,131
HOMOPOLAR DYNAMOELECTRIC MACHINE
Filed July 8, 1936   4 Sheets-Sheet 4

Inventor
Pierre I. Chandeysson.
By Bruninga & Sutherland
Attorneys.

Patented Jan. 28, 1941

2,230,131

UNITED STATES PATENT OFFICE 2,230,131

HOMOPOLAR DYNAMOELECTRIC MACHINE

Pierre I. Chandeysson, St. Louis, Mo.

Application July 8, 1936, Serial No. 89,494

13 Claims. (Cl. 171—212)

This invention pertains to dynamoelectric machines of the homopolar type.

One of the objects of this invention is to simplify the structure of machines of this type.

Another object is to provide a structure which will facilitate ventilation and cooling of the machine.

Another object is to provide a structure by which the size and weight of separate parts may be reduced so as to facilitate shipment and handling of the separate parts.

Further objects will appear from the following description, taken in connection with the accompanying drawings, in which.

Figure 1:
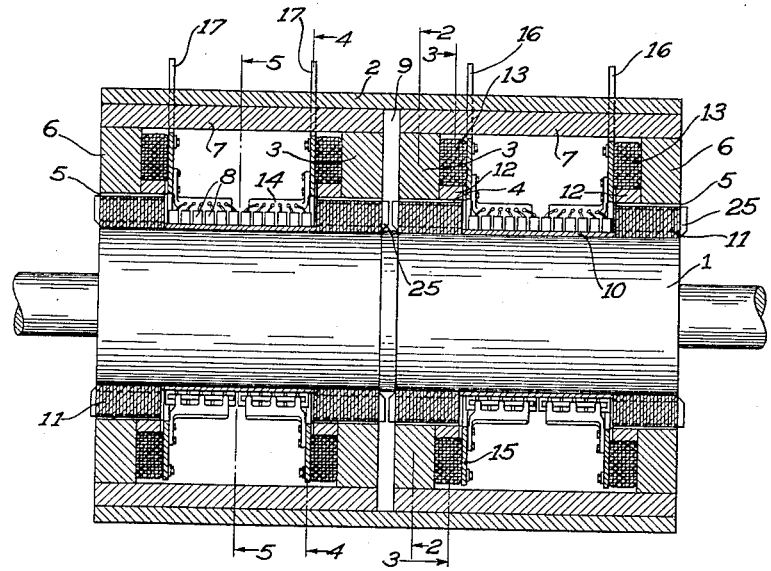
Figure 1 is a longitudinal sectional view of a dynamoelectric machine embodying this invention.

The machine of this invention is of the type described in my Patent No. 1,922,028 issued August 13, 1933. The structure of the present machine is illustrated in simple form in Figure 1. In this figure the rotor is indicated generally at 1 and the stator generally at 2. The magnetic circuit provided by rotor and stator in this machine is divided into two distinct branches, one at each end of the machine. In fact, these branches are so entirely distinct that they may be considered as separate magnetic circuits. If we consider the machine of Figure 1 as divided by a plane extending at right angles to the rotor axis through the middle of the machine, two separate units are formed which not only may be considered separately in developing the theory of operation of the machine, but which may actually be separated physically and may actually be operated as distinct units. One of these units includes one half of the rotor 1, say the right-hand half in Figure 1, the internal radial portion 3 of the field structure, which is separated from the rotor by an air gap 4, the external radial portion 6 of the magnetic field structure which is separated from the rotor by an air gap 5 and a longitudinal portion 7 of the field structure which bridges the portions 3 and 6. A similar unit is formed at the left-hand side, Figure 1, of the machine in which the parts are similarly numbered. Current collecting means such as brushes 8 are arranged to bear upon the middle portion of each half section of the rotor 1 so as to collect the current generated by the machine. In the embodiment of Figure 1 the two units are actually separated by a gap or passage 9.

It will be noted that by separating the two units of the machine by means of the gap 9, instead of combining them as a single structure as in the above mentioned patent, there is gained for each unit an additional cooling surface of considerable area formed by the radial face at the gap 9. This gap not only provides such additional radiating surface but also provides means for access of air to those surfaces for cooling purposes. In the following the machine will be considered as divided into such separate units and the description limited to a single unit as all of these units are substantially alike.

The rotor of each unit consists of a cylindrical body of relatively small diameter upon which the brushes 8 may bear. It will be noted as the description proceeds that the structure is such that the portion of the rotor engaged by the collector brushes 8, which may be termed the collector portion of the rotor, may be given the smallest diameter compatible with the desired output of the machine. An important result is obtained by this feature because it is at this point that the greatest generation of heat in the machine occurs. This generation of heat is due to several causes, namely the friction of the brushes on the rotor surface, the loss of energy in the contact resistance between the brushes and the rotor surface, and the heating of the brushes and the adjacent conductors by the flow of current therethrough. The heating due to friction is dependent upon the speed of travel of the rotor surface at the point of contact and is, therefore, reduced to a minimum by keeping the rotor diameter at this point as small as possible. The contact resistance between brushes and rotor may be reduced to a minimum by providing the rotor with a coating 10 of material such as copper having a high conductivity and providing with the brushes used a low contact resistance.

The output of such a machine depends upon the amount of magnetic flux which traverses the magnetic circuit. As this flux is concentrated in the rotor at the point where the brushes bear thereon, the best magnetic material must be used for this portion of the circuit and the magnetic density at this point must be set as high as possible in order to obtain a high output. The entire flux which traverses the rotor axially must pass out of the rotor at the end thereof and into the stator structure. As the magnetic density in the body of the rotor is usually the maximum which the material can handle economically, it is important that this density be not exceeded at any other portion of the magnetic circuit within the rotor. This applies particularly to the end portion of the rotor where the flux passes radially outward therefrom. If the axial length of this end portion which carries the radial flux is made equal to one fourth of the rotor diameter, the cross sectional area of the magnetic path at this point will be equal to that at the middle of the rotor unit and the magnetic density will be the same. Accordingly the axial length of this portion of the magnetic circuit should not be less than one fourth of the rotor diameter.

The magnetic density in the air gap 5, however, must be materially less than the density in the rotor because the magneto motive force required for such a high flux density in the air gap would be prohibitive. It is desirable, therefore, to increase the cross sectional area of the air gap considerably above that of the rotor portion of the magnetic circuit. Accordingly the end portions of each rotor unit are provided with radial extensions 11. These are in the form of rings of magnetic material embracing the body of the rotor at the end portions. The axial length of these rings is made at least one quarter of the rotor diameter for the reason set forth above. These radial extensions provide end portions for the rotor of increased diameter which carry the magnetic flux in a radial direction from the body of the rotor to the stator portion of the magnetic circuit. It will be noted that, on account of this increase in diameter, the cross sectional area of the magnetic path at the outer periphery thereof, that is at the air gap 5, is considerably greater than the area of the body of the rotor or of the junction thereof with the radial extensions 11. Accordingly the magnetic density in the air gap at the outer periphery of the radial extensions is greatly reduced and may be adjusted to any desired value by properly proportioning the outer diameter and axial length of the radial extension. By this arrangement the magneto motive force required to drive the flux across the air gap is greatly reduced and, consequently, the strength of the exciting coils and the heat loss therein are correspondingly reduced.

The radial portions 3 and 6 of the stator field structure may be reduced in axial length as the cross sectional area of this part of the magnetic circuit is continually increasing as the diameter increases. At the air gap, however, the area must be the same as that of the radial extensions 11 and, accordingly, extension rings 12 in the nature of pole shoes are provided. The field exciting coils 13 are arranged to surround the rotor 1 and may be mounted upon the rings 12. The brushes 8 mounted in suitable brush holders are carried by brackets 14 which in turn are carried by a conductor plate 15. These conductor plates serve to carry the accumulated current from the brushes to terminals 16 and 17 extending through suitable openings in the stator field structure, all the terminals 16 taken together, providing the machine terminal of one polarity (say the positive) and all the terminals 17 providing the machine terminal of opposite polarity.

Figure 2:
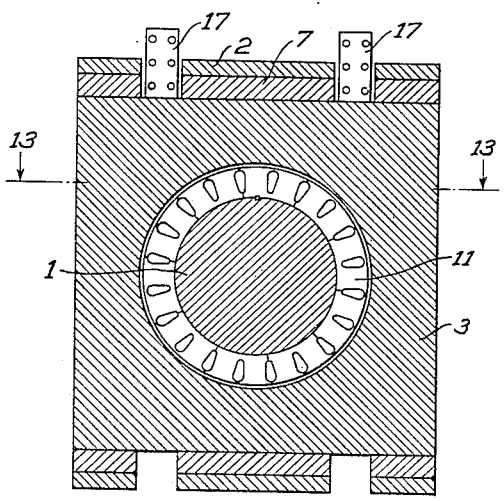
Figure 2 is a section on line 2—2 of Figure 1.
Figure 3:
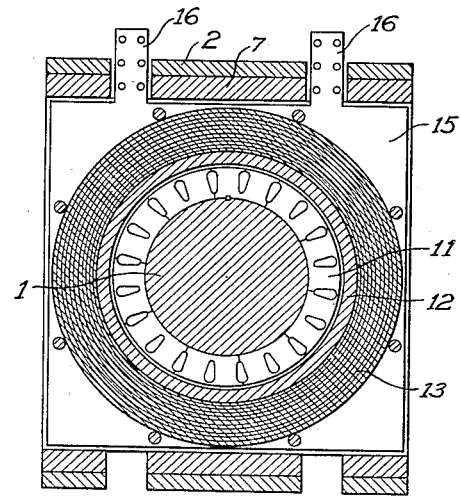
Figure 3 is a sectional view on line 3—3 of Figure 1.
Figure 4:
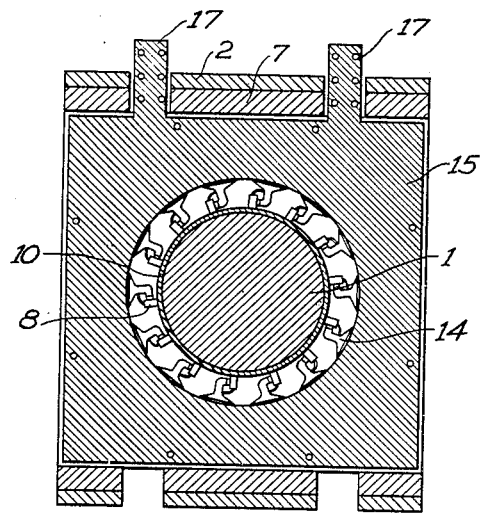
Figure 4 is a sectional view on line 4—4 of Figure 1.
Figure 5:
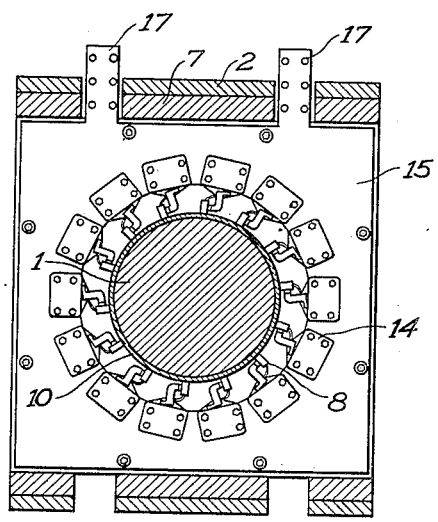
Figure 5 is a sectional view on line 5—5 of Figure 1.
Figure 8:
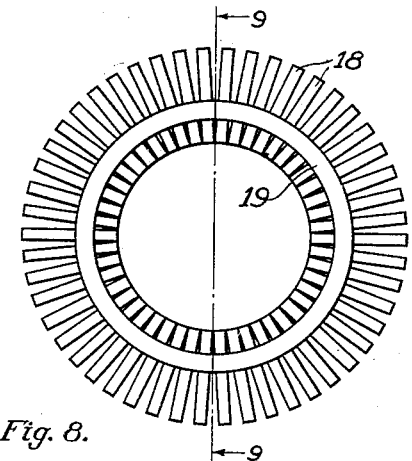
Figure 8 is a view showing a modified construction of the polar extension.
Figure 9:
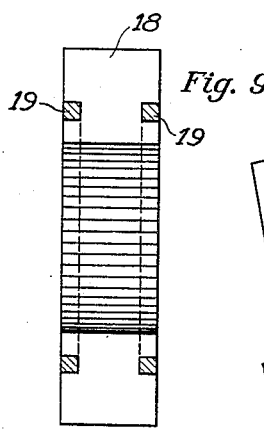
Figure 9 is a section on line 9—9 of Figure 8.
Figure 10:
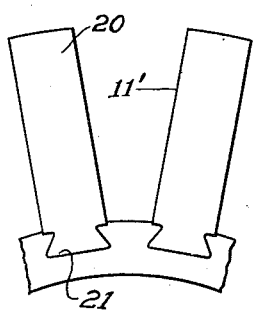
Figures 10 and 11 are details showing other modified constructions of the polar extensions.
Figure 11:
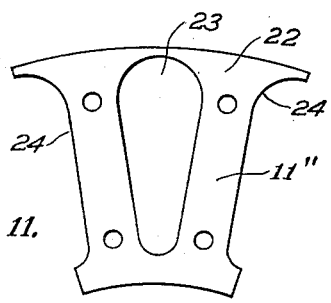

The radial extensions 11 may be made up in a variety of different ways. In Figures 8 and 9 a structure is illustrated, designated generally by the numeral 11 and comprising a series of axially extending plates 18 arranged in a circle as shown in Figure 8 with their inner edges abutting in such a manner as to surround and contact with the end portion of the rotor body. These plates 18 are retained in assembled relation by end rings 19 welded or otherwise secured thereto. The spaces between the plates 18 provide ventilating passages and the plates act as fan blades. They may be set at an inclination to the rotor axis and will then tend to set up a draft in a definite axial direction. In Figure 10, in the structure of the radial extension 11', plates 20 are set in dovetail grooves 21 leaving ventilating spaces therebetween. In Figure 11 a sectional punching is shown, a number of which may be assembled end to end to form a ring around the rotor body, forming the radial extension 11", successive layers of such rings in staggered relation being built up to the required axial length in a well known manner. This punching indicated at 22 may be provided with a central perforation 23 and side half perforations 24 so related that when successive rings of such punchings are assembled one upon the other with the punchings in staggered relations the perforations will extend in an axial direction through the rings. Such an assembly is shown in Figures 2 and 3.

Whatever the structure of the radial extensions 11 may be, it has been found advantageous to equip them with blowers 25 adapted to set up a draft of air through the ventilating passages. Such air is drawn in from the ends of the machine and from the gap 9 and, after passing through the ventilating passages in the radial extensions 11, is directed against the brushes 8 thereby providing a cooling medium which is continually active to carry off the heat generated in the brushes as explained above. This provides for effectively cooling both the brushes and the rotor as the heat of the rotor is transmitted to the brushes and carried off by this cooling draft. The reverse circulation may also be used.

It has been pointed out that each of the units above described is capable of functioning entirely by itself. If such a unit were operated separately from the rest of the machine it would generate an electromotive force which would appear at the terminals 16 as one pole and the center of the end of the rotor body as the other pole. In the embodiment of Figure 1 if the direction of the flux along the rotor is opposite in the two units, the adjacent ends of the rotors of the separate units will have opposite polarities. Accordingly as these adjacent ends are solidly connected together by the continuity of the rotor, the two units are thereby connected in series and the combined voltages of the two units, namely twice the voltage of one unit, will appear at the terminals 16 and 17.

Figure 6:
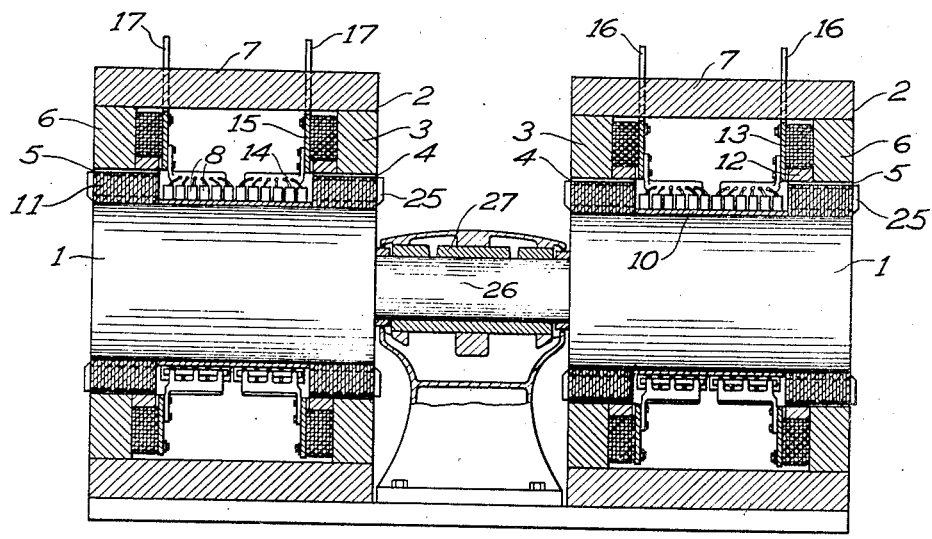
Figure 6 is a sectional view, similar to Figure 1, showing another embodiment of this invention.
Figure 7:
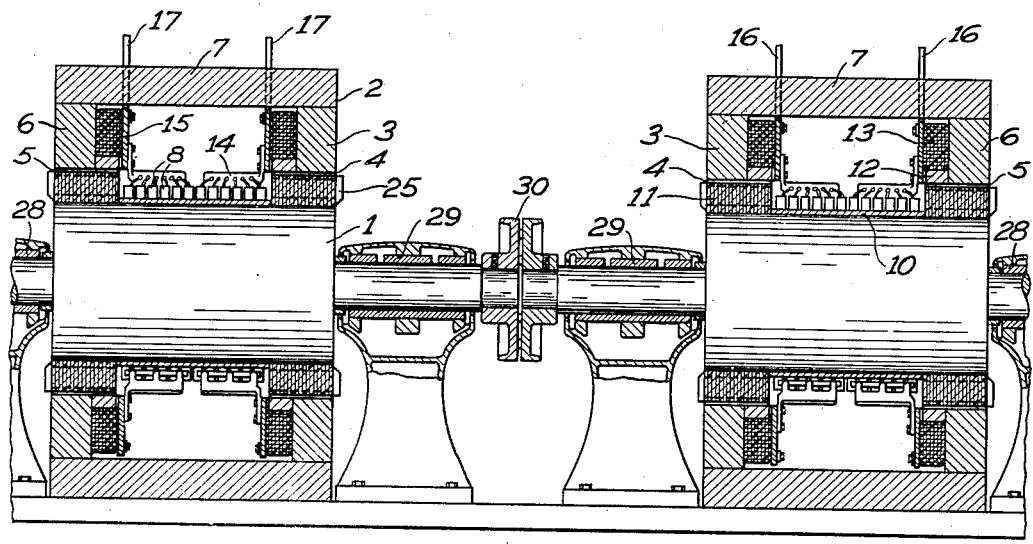
Figure 7 is a similar view showing still another embodiment of this invention.

Other ways of arranging the combinations of the two units may be used. In Figure 6 the units are entirely separate but the rotors are connected by a shaft section 26 journaled in a bearing 27. Such a structure may be used where it is desirable to support the rotor by a bearing in addition to those at the ends. In Figure 7 each unit is entirely separate including the rotors which are supported by end bearings 28 and intermediate bearings 29 while the shafts are connected together by a coupling 30. It will be noted that in both cases of Figure 6 and Figure 7 the units are connected in series through their shafts, the coupling 30, of course, being so arranged as to be capable of carrying the full current out-put of the machine.

Figure 12:
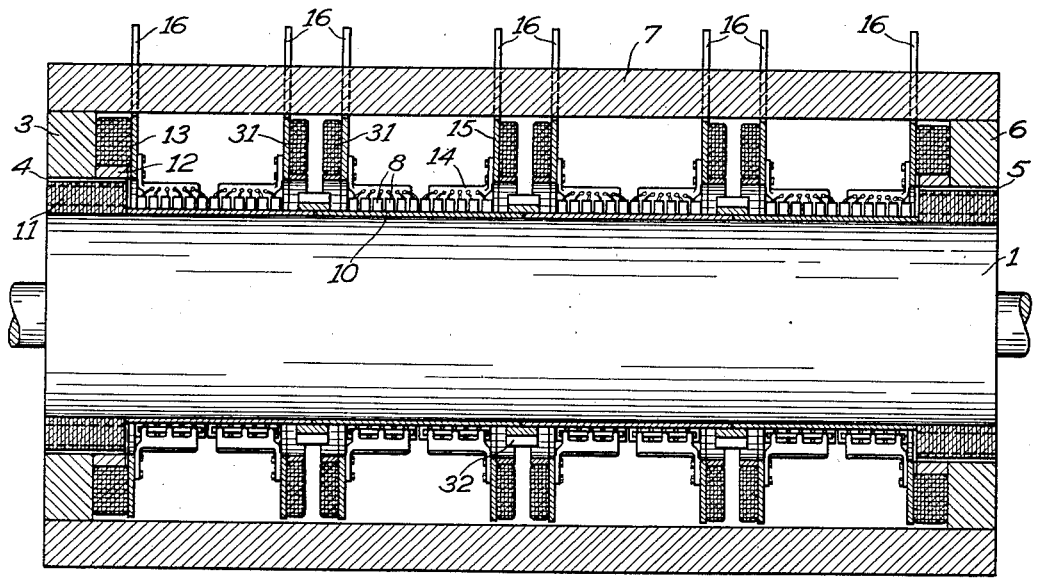
Figure 12 is a sectional view of one half of a machine embodying this invention and adapted for developing large currents.
Figure 13:
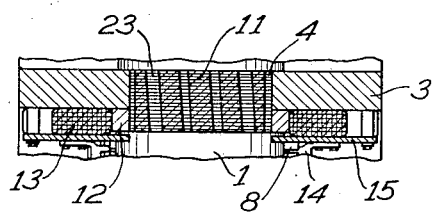
Figure 13 is a detail section on line 13—13 of Figure 2.

Figure 12 illustrates a structure which may be employed in cases where an extra large current must be handled. This figure illustrates a single unit (forming one of the separate units of such an embodiment as shown in Figure 6 or Figure 7) in which the intermediate portion of the rotor has been extended considerably in length so as to make room for a plurality of sets of brushes (connected to terminals 16, all of the same polarity) sufficient to carry the excessive current. In this case, in order to maintain the flux through the rotor more nearly uniform (as it must traverse the entire length from radial portion 3 to radial portion 6 of the stator) auxiliary exciting coils 31 are provided in addition to the main coils 13. In this case blowers 32 may be mounted so as to draw air over the brushes and blow it out between the coils 31, or vice versa.

It will be noted that by thus subdividing the machine into units two important results are obtained. First, the gap 9 or the space between units in Figures 6 and 7 provide additional radiating surface and admit air to the body of the machine for cooling. Second, the size of the rotor units which form the heaviest part of the machine are subdivided and reduced in weight so as to be more easily handled in machining or in transportation.

It will be understood that certain individual features or sub-combinations of this device may be useful by themselves, without reference to other features or the complete combination, and that the employment of such individual features or subcombinations is contemplated by this invention and within the scope of the appended claims.

It is obvious that various changes may be made, within the scope of the appended claims, in the details of construction without departing from the spirit of this invention; it is understood, therefore, that the invention is not limited to the specific details shown and/or described.

Having thus described the invention, what is claimed is:

1. A dynamoelectric machine of the homopolar type, comprising; a plurality of separate generating elements mechanically divided from one another each including, a rotor of magnetic material having a shaft and an elongated cylindrical portion providing an extended current-collecting area, current-collecting means engaging the rotor at said area, a mechanically separate stator providing with said rotor a magnetic circuit surrounding said area, and means for setting up a magnetic field in said circuit adapted to maintain such field throughout said elongated portion; said elements being spaced from each other, and means for connecting said shafts in order to connect said elements electrically in series.

2. A dynamoelectric machine of the homopolar type, comprising; a plurality of separate generating elements mechanically divided from one another each including, a rotor of magnetic material having an extended current-collecting area, current-collecting means engaging the rotor at said area, a mechanically separate stator providing with said rotor a magnetic circuit surrounding said area, and means for setting up a magnetic field in said circuit; said elements having a common shaft adapted to connect the elements electrically in series and being spaced from one another axially along said shaft.

3. A dynamoelectric machine of the homopolar type, comprising; a plurality of separate generating elements mechanically divided from one another each including, a rotor of magnetic material having an extended current-collecting area, current-collecting means engaging the rotor at said area, a mechanically separate stator providing with said rotor a magnetic circuit surrounding said area, and means for setting up a magnetic field in said circuit; said elements having a common shaft adapted to connect the elements electrically in series, and being spaced from one another axially along said shaft, and blowing means adapted to promote air draft along the exposed faces between said spaced elements.

4. A dynamoelectric machine of the homopolar type comprising, a plurality of separate generating units mechanically divided from one another each including, a rotating element having a cylindrical middle portion of relatively small diameter and end portions of greater diameter, a mechanically separate field structure providing with said rotating element a magnetic circuit having air gaps of extended area opposite said end portions adapted to carry a flux traversing said element axially along said middle portion at a high density and radially of said end portions to cross said gaps at a low density, and current-collecting means engaging said element at said middle portion; and means connecting said units electrically in series.

5. A dynamoelectric machine of the homopolar type comprising, a plurality of separate generating units mechanically divided from one another each including, a rotating element having a cylindrical middle portion of relatively small diameter and end portions of greater diameter, a mechanically separate field structure providing with said rotating element a magnetic circuit having air gaps of extended area opposite said end portions adapted to carry a flux traversing said element axially along said middle portion at a high density and radially of said end portions to cross said gaps at a low density, and current-collecting means engaging said element at said middle portion; means for assembling said units in axially spaced relation, means to set up an air draft between the field structures of said units, and means connecting said units electrically in series.

6. A dynamoelectric machine of the homopolar type, comprising, a rotating element having radially extended end portions and a contracted middle portion, means for passing a magnetic flux axially along said element, current-collecting means engaging said element adjacent the point of maximum concentration of said flux, means for cooling said collecting means, and means providing a return current path to said rotating element.

7. A dynamoelectric machine of the homopolar type, comprising, a rotating element having a cylindrical middle portion of relatively small diameter and an end portion outstanding radially therefrom and axially perforated by a ventilating opening formed to provide a fan, and current-collecting means engaging said element at said middle portion.

8. In a homopolar dynamoelectric machine of the character described, a rotating element having a cylindrical middle portion of relatively small diameter and an end portion of greater diameter formed of a plurality of separate pieces assembled in regular order to provide a radially extending magnetic path.

9. In a homopolar dynamoelectric machine of the character described, a rotating element having a cylindrical middle portion of relatively small diameter and an end portion of greater diameter formed of a plurality of separate pieces assembled in regular order to provide a radially extending magnetic path intersected by transverse openings.

10. In a homopolar dynamoelectric machine of the character described, a rotating element having a cylindrical middle portion of relatively small diameter and an end portion of greater diameter formed of a plurality of separate pieces assembled in such order as to provide a radially extending magnetic core having means adapted to set up an air draft.

11. In a homopolar dynamoelectric machine of the character described, a rotating element having a cylindrical middle portion of relatively small diameter and an end portion of greater diameter formed of a plurality of axially extending plates assembled in ring form around said portion of small diameter and secured in assembled relation by end rings secured thereto.

12. In a homopolar dynamoelectric machine of the character described, a rotating element having a cylindrical middle portion of relatively small diameter and an end portion of greater diameter formed of a plurality of laminated plates assembled in radially extending relation around said portion of small diameter.

13. In a homopolar dynamoelectric machine of the character described, a rotating element having a cylindrical middle portion of relatively small diameter and an end portion of greater diameter formed of a plurality of laminated plates assembled in radially extending relation around said portion of small diameter and relatively positioned to provide axially extending air passages through said end portion.

PIERRE I. CHANDEYSSON.